United States Patent [19]

Pastorius

[11] 4,149,070
[45] Apr. 10, 1979

[54] CODE SYMBOL INSPECTION ARRANGEMENT

[76] Inventor: Louis E. Pastorius, 529 W. Hillsdale, Inglewood, Calif. 90302

[21] Appl. No.: 876,091

[22] Filed: Feb. 8, 1978

Related U.S. Application Data

[63] Continuation of Ser. No. 651,796, Jan. 23, 1976, abandoned, which is a continuation-in-part of Ser. No. 550,426, Feb. 18, 1975, abandoned.

[51] Int. Cl.² .............. G06K 21/06; G01B 3/04; G09C 5/00; B41F 3/82
[52] U.S. Cl. .............. 235/495; 33/107 R; 35/2; 101/1
[58] Field of Search .............. 235/495; 35/2, 40; 101/1; 73/156, 157; 33/174 B, 174 G, 107 R, 111

[56] References Cited

U.S. PATENT DOCUMENTS

| | | | |
|---|---|---|---|
| 1,535,066 | 4/1925 | Vahjen | 35/2 |
| 2,089,272 | 8/1937 | Lake et al. | 235/495 |
| 2,579,664 | 12/1951 | Gleasman | 33/107 R |
| 2,736,097 | 2/1956 | Coleman, Jr. | 33/107 R |
| 2,857,687 | 10/1958 | Erdman | 35/2 |
| 3,154,861 | 11/1964 | Rubenstein | 33/107 R |
| 3,220,301 | 11/1965 | Koonz et al. | 235/494 |
| 3,344,529 | 10/1967 | Brown | 73/156 |

*Primary Examiner*—Daryl W. Cook
*Attorney, Agent, or Firm*—Richard F. Carr

[57] ABSTRACT

This invention provides an inspection arrangement for a code symbol consisting of a plurality of spaced parallel bars of different widths and predetermined spacing, the inspection arrangement including a sheet having a plurality of spaced viewable areas which may be defined by the edges of windows in the sheet member. The windows have relatively wide portions which are the maximum width dimensions for the corresponding bars of the code symbol and relatively narrow portions at the minimum bar width dimensions. The inspection device is placed over the code symbol and positioned to determine if all of the bars can be made to fall entirely within their corresponding inspection windows. The device also is positioned to center the bars to ascertain if their dimensions are at least as wide as that of the relatively narrow portions of their inspection windows. Also included may be windows of intermediate widths for determining when tolerance limits are being approached, as well as lines for measuring the clearance around the code symbol.

32 Claims, 13 Drawing Figures

CODE SYMBOL INSPECTION ARRANGEMENT

CROSS REFERENCE TO RELATED APPLICATION

This application is a continuation of application Ser. No. 651,796, filed Jan. 23, 1976, for CODE SYMBOL INSPECTION ARRANGEMENT, now abandoned, said application being, in turn, a continuation-in-part of patent application Ser. No. 550,426, filed Feb. 18, 1975, for CODE SYMBOL INSPECTION ARRANGEMENT, now abandoned.

BACKGROUND OF THE INVENTION

1. Field of the Invention

This invention relates to an inspection arrangement for a printed code symbol, in particular to the inspection of a bar code symbol.

2. Description of the Prior Art

In an improved checkout system for self-service stores, the packages of the products for sale are provided with a universal product code symbol which provides information enabling the price of the item to be printed and displayed through a computer controlled system. The universal product code consists of a rectangular pattern of parallel bars, the bars being of predetermined widths and at predetermined distances apart. The relative widths of the bars and their spacing provides information with respect to the name of the product, its manufacturer and the package size. At the checkout stand, the code symbol is scanned as the package is conveyed through a reader, feeding a signal to a computer programmed with pricing data for various products and their package sizes. The computer then transmits a signal causing a display of the price of the item and an imprinting of a tape that forms a receipt for the purchaser. This system is very efficient, reducing the labor requirements for market checkout stands, as well as speeding up the checkout operation and insuring greater accuracy.

An essential part of the system is an accurate reproduction of the proper code symbol on each package. When the package is printed it is necessary that the bars of the code symbol be imprinted within closely defined spacing tolerances and that the various bars have widths within permissible maximum and minimum dimensions. If this is not adhered to, the symbol cannot be read properly and the automatic system will not function.

Various conditions will affect the nature of the bars imprinted. The viscosity of the ink used has a direct bearing on the widths of the bars printed in the code symbol. Thinner inks will spread more than thicker inks. The material of the package also influences the bar width. Some materials are more porous than others to provide variations in the flow of the ink. Also, the pressure achieved in the printing operation, to some extent dependent upon the thickness of the package material, will have a bearing upon the widths of the bars produced in the symbol.

Accordingly, it is necessary to make periodic inspections of packages as they are printed to make certain that the universal product code symbols remain within permissible tolerances. In the past, this has been possible only by a meticulous inspection of the code symbol through the use of an optical comparator. This not only requires the expense of a comparator when the inspection is to be made, but also is a very tedious, slow and expensive operation.

Bar code symbols are coming into other and more widespread use outside of retail stores, such as in inventory control, with similar problems in assuring accurate reproduction of the code symbol.

SUMMARY OF THE INVENTION

The present invention provides a simple and low cost gauge device which can be used in obtaining rapid inspection of the universal product code symbol or other bar code symbol. The gauge consists of a sheet member which has viewable areas on it which are spaced apart and at distances corresponding to the spacing required for the bars of the particular code symbol to be inspected. Normally, these viewable areas are defined by windows along the edge of the sheet member, with the edges of the windows setting out the areas through which the code symbol may be viewed. The windows have relatively wide portions that correspond to the maximum widths permitted for the bars in the code symbol. The windows also include relatively narrow portions which correspond to the minimum width dimensions permissible for the bars in the code symbol. In providing the relatively wide and narrow portions, the windows preferably are made T-shaped.

In the inspection proceedings, a gauge is placed over the code symbol and the inspection carried out under magnification. The gauge is first positioned relative to the symbol to determine if it is possible for each of the bars to fall entirely within the window that corresponds to its location. If at any one position this relationship can occur, the bar spacing requirement has been met. This also indicates that the bars do not exceed the maximum allowable widths. If it is not possible to have all of the bars fall within their windows, the symbol is out of tolerance and the package has railed the inspection. The inspection procedure also includes a determination of whether or not the bars are of sufficient width to meet the minimum tolerance dimensions. For many of the bars it is instantly apparent that they are wider than the narrow portions of the corresponding inspection windows. Others, however, will require centering in their windows before minimum width can be checked. For these the gauge is shifted laterally to center the bar within the window.

Each window may contain two additional areas of intermediate widths to enable determination of when an out of tolerance condition is being approached. One area is wider than the minimum bar width by a predetermined amount. The other is narrower than the maximum bar width by a certain dimension. An acceptable bar that either is wider than the latter area or narrower than the narrow intermediate area will signal that the tolerance limit is being approached. This will enable corrective measures to be taken prior to imprinting the symbol incorrectly.

Lines may be provided at either end of the row of inspection windows to allow measurement of the clear area around the code symbol. This is another critical factor because it is not permissible for other printing to come too close to the code symbol in order that the scanner will be able to read the symbol.

BRIEF DESCRIPTION OF THE DRAWINGS

FIG. 7 is a top plan view of a further modified form of the gauge;

FIG. 8 is an enlarged fragmentary view of a portion of the window area of the gauge of FIG. 7;

FIG. 9 is an enlarged fragmentary plan view of another portion of the window area;

FIG. 10 is a plan view of a code symbol that can be measured by the gauge of FIG. 7;

FIG. 11 is a plan view of another code symbol which also may be measured by the gauge of FIG. 7;

FIG. 12 is an enlarged fragmentary plan view showing the use of the gauge of FIG. 7 in measuring the code symbol of FIG. 9; and FIG. 13 is a view similar to FIG. 11 illustrating the measurement of the code symbol of FIG. 10.

DESCRIPTION OF THE PREFERRED EMBODIMENT

Figure 1:
FIG. 1 is a plan view of a segment of a package upon which is printed a universal product code symbol.

In FIG. 1 there is illustrated a segment of a package 10 upon which is imprinted a universal product code symbol 11. The latter element is made up of a plurality of bars 12 which are parallel to each other and collectively form a substantially rectangular pattern. When properly imprinted, the code symbol 11 includes bars of different widths, typically including up to four different widths, the larger bars being even numbered multiples of the width of the narrowest bar. In other words, considering the narrowest bar to have a width of one unit, there may be included in the code symbol 11 additional bars of two, three and four units in width. The bars 12 also must be spaced at predetermined distances from each other.

The arrangement of the bars 12 in the code symbol 11, both as to bar width and as to bar spacing, conveys information which can be read by a scanner at the checkout counter of a store and transmitted to a computer programmed to produce an appropriate readout of price and product identification. Normally, the code symbol 11 will supply information with respect to the manufacturer of the product, the size of the package and the name of the product. With this information the computer can generate a signal for a readout that includes the product's price. Of course, packages of different sizes and those for other products have code symbols with different arrangements of the bars 12, both as to bar width and spacing, from that of the symbol 11, but in all events, the code symbol is in rectangular pattern of bars such as illustrated in FIG. 1.

The numerals 13 appearing at the lower edge of the code symbol 11 provide a visible representation of the information contained in the bars 12 so that appropriate information can be fed manually into the computer, if for some reason the scanner is unable to function properly with respect to the code symbol imprinted on the package. This will occur if the bars are of improper widths or if their spacing is not correct. Such manual operation is inefficient, being time consuming and defeating the purpose of the automatic price and product identification made possible through the use of the universal product code.

Figure 2:
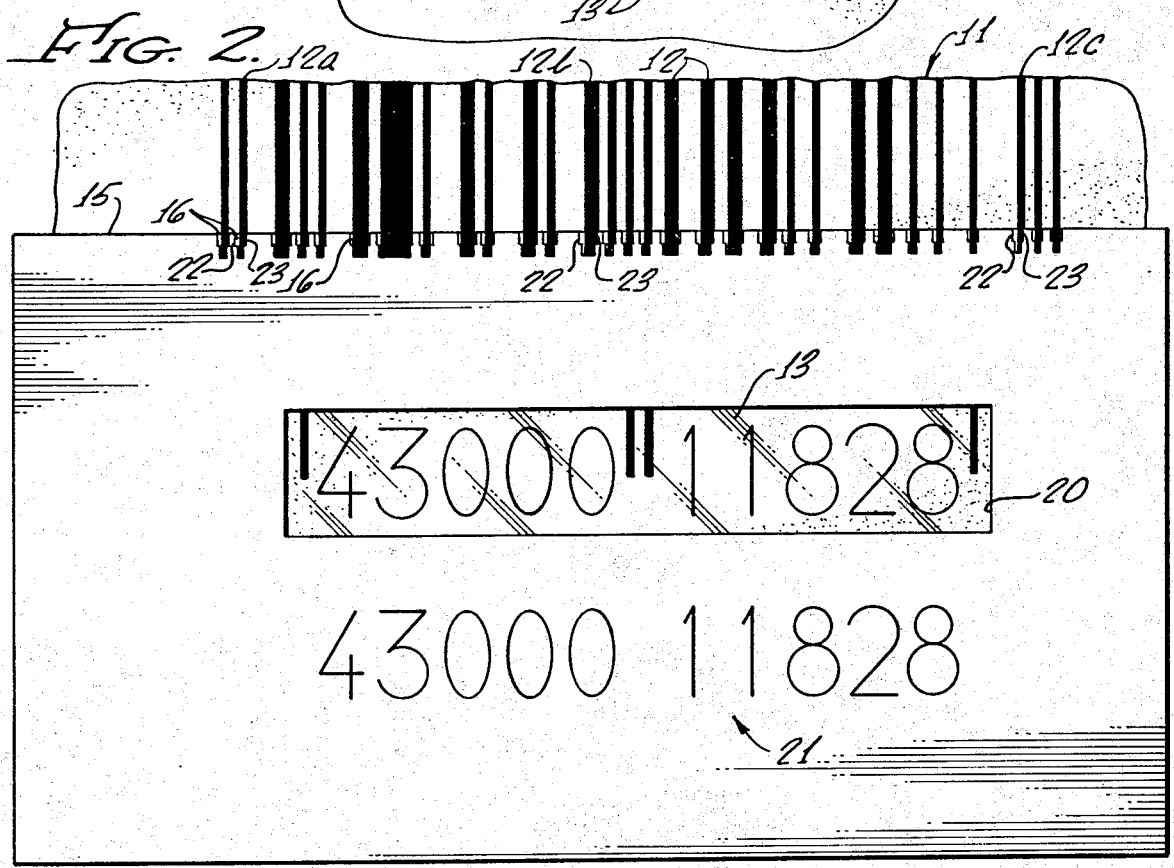
FIG. 2 is an enlarged plan view of the inspection gauge of this invention in use in checking the code symbol of FIG. 1.

The gauge 14, shown in FIG. 2, is used to establish whether or not the code symbol 11 is within acceptable tolerances as to the spacing of the bars 12 and the widths of the bars. If the bars do not fall within acceptable limits in both respects, it is known that the code symbol 11 is unusable so that the package can be discarded before it is used and corrective measures can be taken to print the symbol properly.

The gauge 14 is of flat sheet material which is opaque or semi-opaque, suitably made of a plastic material, which may be flexible but which possesses rigidity. The gauge 14 is rectangular and along one edge 15 are windows 16 which are perpendicular to the edge and equal in number to the number of bars in the code symbol 11. The windows 16 are transparent areas spaced apart at predetermined distances corresponding to the spacing required for the bars of the code symbol 11. Each window 16 is symmetrical and substantially T-shaped, including a relatively wide outer portion 17 and a central narrower portion 18. The wide and narrow portions 17 and 18 of each of the windows 16 represent the maximum and minimum allowable widths for the bar 12 at the corresponding location within the code pattern 11. If a bar is wider than the section 17 of its window 16, it is unacceptably wide, and if narrower than the section 18 of the window, it is narrower than allowable.

Also included in the gauge 14 is a rectangular window 20 positioned inwardly of and parallel to the edge 15 of the gauge. Beneath the window 20 are numerals 21 reproducing the numerals 13 of the code symbol 11 for which the gauge 14 is designed.

In use of the gauge 14 of this invention, it is placed over the imprinted code symbol 11 on the package 10 so that the bars 12 are perpendicular to the edge 15 of the gauge. The numerals 13 of the code symbol 11 are positioned at the window 20 in the gauge for ready comparison with the numerals 21 imprinted on the gauge. This enables it to be told at a glance whether or not the proper gauge is used for checking the code symbol 11, as the numerals 13 and 21 should correspond exactly.

The gauge is superimposed on the code symbol 11 so that each of the bars 12 is located at the corresponding window 16 at the edge 15 of the gauge. The windows 16 provide viewable areas for observing the bars 12, these areas being bounded by the opposed parallel side edges 22 and 23 of the wide portions 17 of the windows, and the parallel side edges 24 and 25 of the inner narrow parts 18 of the windows. The windows 16 and bars 12 are viewed under twenty power magnification during the inspection procedure. The first determination normally made is whether or not the spacing of the bars 12 is within permissible tolerances. This requirement is met if each of the bars is entirely received within a corresponding window 16. With the gauge positioned as shown in FIG. 2, it does not appear that the bars 12 meet the spacing tolerances because three of them have portions that fall outside of their windows 16. These are the bars 12a, 12b and 12c appearing at the left, central and right regions of the pattern, which overlap the side edges 23 of the outer portions 17 of their inspection windows 16. However, the gauge 14 may be repositioned relative to the code symbol 11 to determine whether or not there is any relative position in which the bars all extend through their windows, because if the bars meet this condition in any relative position of the gauge, their spacing is satisfactory. Therefore, with the bars 12a, 12b and 12c all overlapping the right-hand edges of their windows in the position of FIG. 2, movement of the gauge 14 to the right to the position of FIG. 3 will give a more realistic evaluation of the spacing of the bars 12 as required by the gauge 14. When located as in FIG. 3, it can be seen that all of the bars 12 extend through their windows 16, with no portions outside, and so the spacing of the bars in the pattern 11 is acceptable.

Figure 3:
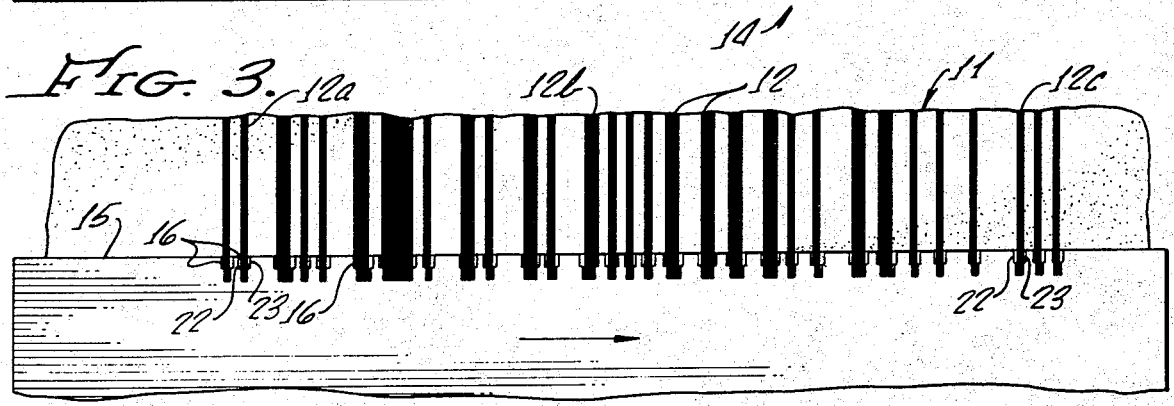
FIG. 3 is a fragmentary view of a gauge and code symbol, with the gauge repositioned for determining bar spacing and maximum bar width in the code symbol.

With the bars 12 all extending through their inspection windows 16, as in FIG. 3, it is established also that the bars 12 do not exceed allowable widths. They cannot be too wide if none overlaps the side edges 22 and 23 of the outer window portions 17.

Figure 4:
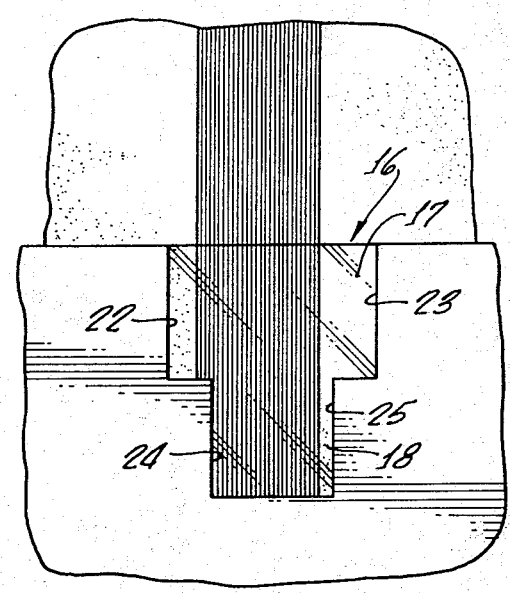
FIG. 4 is an enlarged fragmentary plan view of a code symbol bar and inspection window of the gauge.
Figure 5:
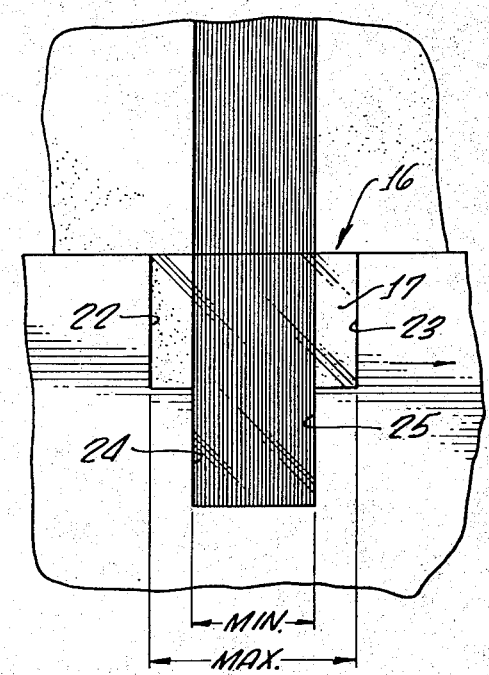
FIG. 5 is a view similar to FIG. 4, but with the gauge repositioned to center the bar in the window.

For many of the bars 12 when the gauge is positioned as in FIG. 3, it will be apparent that they are within the lower tolerance limits for bar widths. In other words, for these bars 12 it will be obvious that the bar is wider than the portion 18 of the window in the gauge. Other bars 12, however, will require repositioning of the gauge 14 relative to the code symbol 11 to make an accurate assessment of width. For example, if a rather narrow bar 12 is off-center in the window 16, as illustrated in FIG. 4, it is difficult to ascertain whether or not it is as wide as section 18 of the window 16. However, by a slight repositioning of the gauge 14 relative to the code symbol 11, as in FIG. 5, centering the bar 12 relative to the window 16, it can be seen that it extends beyond the side edges 24 and 25 of the narrow window part 18 and so meets the tolerance requirements.

The inspection proceeds with a bar-by-bar test, as necessary, repositioning the gauge slightly as required to center the bars in their inspection windows.

Figure 6:
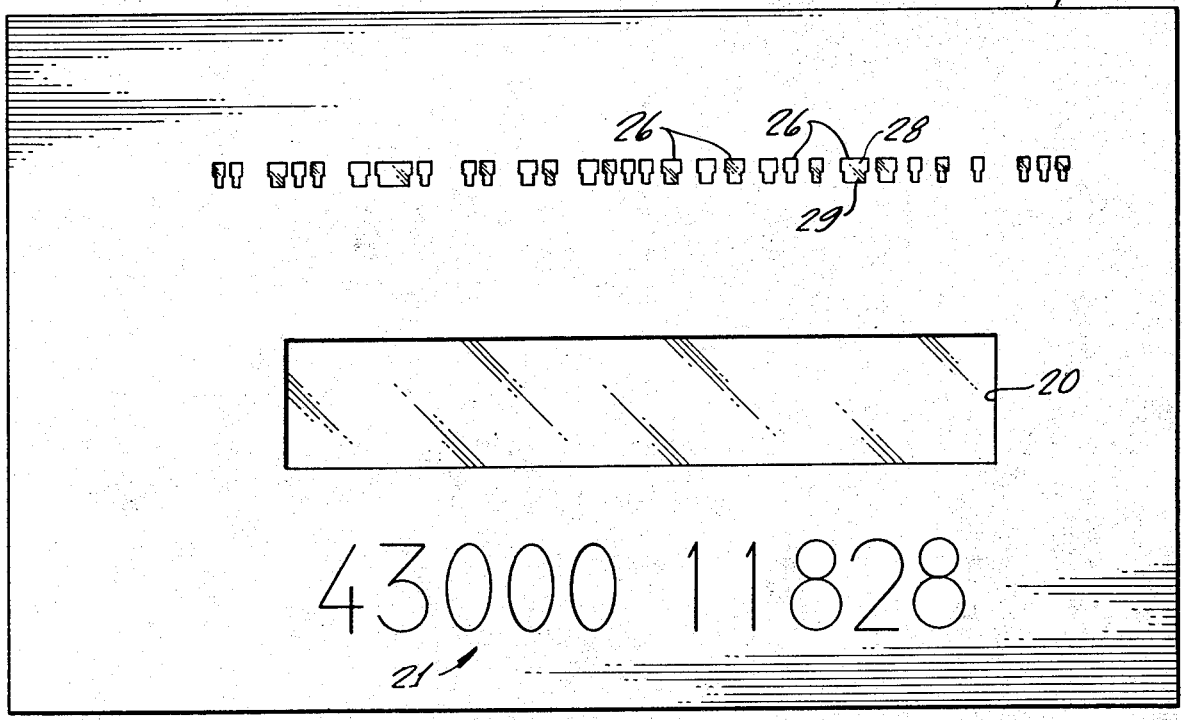
FIG. 6 is a plan view of a modified form of the inspection gauge.

The gauge may be modified as indicated in FIG. 6 in which arrangement windows 26 in the gauge 27 replace the windows 16 of the gauge 14 described above. The windows 26 are located inwardly of the edges of the gauge 27 and at a spacing corresponding to the requirements of the code symbol 11. Again, there are relatively wide portions 28 and narrower portions 29 which represent the tolerances of maximum and minimum bar width. The lateral dimensions of the wide and narrow portions of the windows 26 are correlated to suit the particular pattern of bars in the code symbol 11 which is to be tested.

The inspection areas may be inverted or defined in other ways, but will retain the wide and narrow portions in modifications of the inspection gauge.

Rather than measure the width of each bar in the code symbol, as described above, sufficiently accurate results normally can be obtained by measuring only selected bars to simplify the inspection procedure. If appropriately chosen bars are within tolerance, it can be assumed that the remaining bars likewise are imprinted with sufficient accuracy. The gauge 31, shown in FIG. 7, is especially adapted for measuring selected bars of the code symbol. As for the other gauges, the gauge 31 is appropriately made of a rectangular sheet of plastic material, which in this instance is transparent except for the opaque areas shown. This includes, along the straight edge 32 of the gauge, opaque portions that define two windows 33 at the left-hand portion, an additional two windows 33 at the center and two more windows 33 at the right-hand side. These are used to measure the widths of the two bars at the left-hand edge of the code symbol, the two at the center of the code symbol and the two at the right-hand extremity, as described below.

In addition to the windows 33, the gauge includes two windows 34 between the left and central pairs of windows 33, and three windows 34 between the center and right-hand sets of windows 33. The windows 34 are used in measuring the bars of a zero-suppressed code symbol of the type shown in FIG. 11, which is narrower than the regular code symbol. The zero-suppressed code symbol is condensed, having fewer bars to represent six digits instead of ten, and sometimes is used in lieu of the regular symbol.

Each of the windows 33, as seen in the enlarged view of FIG. 8, includes a relatively wide outer part 35 extending inwardly from the edge 32 of the gauge. This connects to a narrower inner part 36 of the window 33. The portions 35 and 36 are similar to the parts 17 and 18 of the previously described gauge. In other words, they represent the maximum and minimum widths permissible for the bars corresponding to their locations. A bar wider than the portion 35 or narrower than the portion 36 is not acceptable.

The windows 33 include additional portions 37 that are inwardly of the narrow portions 36, beyond which are wider parts 38. The window portions 37 and 38 are aligned with the window sections 35 and 36, and are of intermediate widths. The portion 37 of the window 33 is wider than the narrow part 36. The part 38 of the window is wider than the portion 37, but narrower than the wider part 35 of the window. The opposite straight side edges 39 and 40 of the windows 33 are parallel to each other in the portions of intermediate widths, as well as in the sections 35 and 36, and are perpendicular to the edge 32 of the gauge.

The window sections 37 and 38 provide a means for checking the bars while they are within tolerance limits to enable corrective measures to be taken prior to the time that the code symbol is printed improperly. This avoids printing unacceptable code symbols and attendant scrapping of materials. With the section 37 being relatively narrow yet wider than the minimum permissible bar width, it can give an indication that an unacceptable condition is approaching. Thus, if the bar positioned in the window portion 37 is approximately the width of this window portion or narrower, it is known that the bar width is becoming so narrow that in a brief period it may not equal the minimum acceptable width. This provides a warning to the operator of the printing equipment. Similarly, if the bar is equal to or greater than the width of the window portion 38, it is known that an unacceptably wide bar width is being approached. Again, corrective measures may be taken prior to imprinting bars that are out of tolerance.

Preferably, the window sections 37 and 38 are given widths which are a predetermined percentage of minimum and maximum bar widths. Typically, the width of the window section 37 is equal to the nominal width of the bar less eighty percent of the negative tolerance. The wider section 38 is the nominal width of the bar plus eighty percent of the positive tolerance for the bar. For example, if a bar has a nominal width of 0.009 inch and a tolerance of ±0.004 inch, the window section 37 will have a width of 0.0058 inch, which is 0.009 inch minus 0.0032 inch. The latter figure is eighty percent of the 0.004 negative tolerance. The wider intermediate section 38 will have a width of 0.0122 inch. This is the nominal width of 0.009 plus eighty percent of the positive tolerance, or 0.0032 inch.

The zero-suppressed code symbol windows 34 are similar to the windows 33 in that they include four sections of different widths. The two outer parts 41 and 42 correspond to the nominal bar widths with the full positive and negative tolerances (see FIG. 9). The window sections 43 and 44 of intermediate widths may represent nominal bar widths and a certain percentage of the tolerances. Eighty percent of the plus and minus tolerances is suitable for the windows 34 as it was for the windows 33.

As shown in FIG. 12, the gauge 31 is superimposed on the regular universal product code symbol 45, which appears separately in FIG. 10. Only the windows 33 are employed in this instance. The windows 33 measure the widths of the two left-hand bars 46 of this symbol, the two central bars 46 and the two right-hand bars 46. This is sufficient for establishing the accuracy of the entire code symbol 45.

In FIG. 13, the gauge 31 is in use in checking the zero-suppressed code symbol 47 of FIG. 11. The two left-hand bars 48 are measured in width at the two left-hand windows 34, and the three bars 48 at the right-hand edge of the symbol 47 are measured in the three right-hand windows 34. The windows 33, of course, are not used when the zero-suppressed code symbol 47 is being measured.

The windows 33 and the windows 34 may be provided in separate gauges, although ordinarily the combined gauge 31 is preferred because of its versatility and convenience.

The gauge 31 provides an additional measurement for each of the code symbols 45 and 47. This is a measurement of the margin of unimprinted area around the code symbol, which is another factor critical to the proper reading of the symbol. There must be a clear area of a predetermined width on either side of the code symbol. The two lines 50 and 51, spaced outside of the row of windows 33, provide this marginal measurement for the regular code symbol. When the gauge is positioned as in FIG. 12, with the bars 46 being measured at the windows 33, there should be clear areas extending from the code symbol 45 at least to the lines 50 and 51. In the absence of this, the printing is not acceptable. It is a simple matter to view other material printed on the package at the time of the inspection to determine whether or not any falls within the lines 50 and 51.

Similar lines 52 and 53 are provided outside of the windows 34 which are used in measuring the zero-suppressed code symbol 47. Again, there must be no imprinting within the lines 52 and 53 for a properly imprinted code symbol.

To assist in relatively positioning the gauge and the code symbol prior to the inspection procedure, opposed edges are provided on the gauge, spaced apart the overall width of the code symbol. For the regular code symbol 45, these are the edges 54 and 55 that are parallel to the windows 33 and inwardly of the margin lines 50 and 51. Similar lines 56 and 57 are included for the zero-suppressed code symbol 47.

The gauge of this invention is modified easily for inspecting bar code symbols other than the universal product code symbol. The principles of bar width and spacing measurement described above apply in measuring various kinds of bar code symbols.

The foregoing detailed description is to be clearly understood as given by way of illustration and example only, the spirit and scope of this invention being limited solely by the appended claims.

I claim:

1. In combination with an object having a code symbol made up of a plurality of parallel bars imprinted thereon, which bars are to have a predetermined spacing and predetermined widths, a device for inspecting said code symbol comprising,
   a sheet member,
   and means on said sheet member defining the borders of discrete viewable areas,
      said areas being spaced apart at distances corresponding to the spacing required for at least some of said bars of said code symbol, each of said areas having a relatively wide portion and a relatively narrow portion,
      each of said relatively wide portions having two opposed edges spaced apart the dimension of the maximum permissible width of a bar at the corresponding location in said code symbol, and each of said relatively narrow portions having two opposed edges spaced apart the dimension of the minimum permissible width of a bar at the corresponding location in said code symbol, said sheet member being adjacent said object and said code symbol such that at least some of said bars are visible at said viewable areas for determining if said bars have said predetermined spacing and predetermined widths.

2. A device as recited in claim 1 in which said viewable areas are arranged in a straight row.

3. A device as recited in claim 2 in which said areas are substantially T-shaped, and said opposed edges of said relatively wide portions and of said relatively narrow portions are parallel to each other.

4. A device as recited in claim 3 in which said means on said sheet includes windows the edges of which define said borders of said discrete viewable areas.

5. A device as recited in claim 4 in which said sheet member is substantially opaque adjacent said windows, said windows being transparent areas of said sheet member.

6. A device as recited in claim 1 in which said code symbol includes numerals imprinted on said object in addition to said bars, and said sheet includes numerals thereon corresponding to said numerals of said code symbol for comparison therewith.

7. A device as recited in claim 6 in which said numerals of said code symbol are in a predetermined location relative to said bars, and said sheet member includes an additional viewable area at a predetermined location thereon such that when said sheet member is superimposed on said code symbol at a predetermined relative position of said sheet member and code symbol said numerals of said code symbol can be viewed at said additional viewable area and each of said bars can be viewed at the corresponding one of said discrete viewable areas.

8. A device as recited in claim 1 in which said viewable areas are fewer in number than said bars and correspond in position to selected ones of said bars.

9. A device as recited in claim 8 in which
   said sheet has a straight edge,
   said viewable areas being windows extending inwardly from said straight edge,
   said relatively wide portions being adjacent said straight edge, and
   said relatively narrow portions being inwardly of said relatively wide portions.

10. A device as recited in claim 8 in which there are at least two of said viewable areas at one location on said sheet member for viewing said bars at one end of said code symbol, and at least two of said viewable areas at a second location on said sheet member, spaced from said one location by a predetermined amount such as to correspond to said predetermined spacing for said bars at the opposite end of said code symbol, for viewing said bars at the opposite end of said code symbol, additional bars of said code symbol being positioned between said first and second locations and remote from said viewable areas at said first and second locations.

11. A device as recited in claim 10 in which there are two of said viewable areas at a third location on said sheet member intermediate and spaced from said first and second locations for measuring said bars at the opposite ends and center of said code symbol, said viewable areas at said third location corresponding in position to that required for two of said bars at the central portion of said code symbol, said additional bars including bars between said third and said first locations, and between said third and said second locations and remote from said viewable areas at said third location.

12. A device as recited in claim 10 in which there are two of said viewable areas at said one location on said sheet member for viewing said bars at one end of said code symbol, and three of said viewable areas at said second location on said sheet member.

13. A device as recited in claim 1, in which there are two sets of said viewable areas, one of said sets of said viewable areas being wider than the other of said sets of said viewable areas, said one set of viewable areas being for inspecting a code symbol of relatively large width and said other of said sets of viewable areas being for inspecting a code symbol of relatively small width.

14. A device for inspecting a code symbol made up of a plurality of parallel bars, which bars are to have a predetermined spacing and predetermined widths, comprising,
a sheet member,
and means on said sheet member defining the borders of two sets of discrete viewable areas,
said areas being spaced apart at distances corresponding to the spacing required for said bars of said code symbol, each of said areas having a relatively wide portion and a relatively narrow portion,
each of said relatively wide portions having two opposed edges spaced apart the dimension of the maximum permissible width of a bar at the corresponding location in said code symbol, and each of said relatively narrow portions having two opposed edges spaced apart the dimension of the minimum permissible width of a bar at the corresponding location in said code symbol, one of said sets of said viewable areas being wider than the other of said sets of said viewable areas, said one set of said viewable areas being for inspecting a code symbol of relatively large width and the other of said sets of said viewable areas being for inspecting a code symbol of relatively small width, said other set of viewable areas being positioned within said one set of viewable areas.

15. A device as recited in claim 14 in which one of said sets of viewable areas includes two of said viewable areas at a first location on said sheet member, two of said viewable areas at a second location on said sheet member spaced from said one location, and two of said viewable areas at a third location intermediate said first and second locations for measuring said bars at the opposite ends and center of a relatively wide code symbol,
and the other of said sets of viewable areas includes two of said viewable areas at a fourth location on said sheet member intermediate said first and third locations, and three of said viewable areas at a fifth location on said sheet member intermediate said second and third locations for measuring said bars at the opposite ends of a relatively narrow code symbol.

16. A device as recited in claim 1 in which each of said discrete viewable areas includes a second relatively narrow portion wider than said first-mentioned relatively narrow portion, and a second relatively wide portion narrower than said first-mentioned relatively wide portion.

17. A device as recited in claim 16 in which said viewable areas are transparent windows in said sheet member, said windows including parallel straight opposed edges in said fist-mentioned relatively wide and relatively narrow portions, and in said second relatively wide and relatively narrow portions.

18. In combination with an object having a code symbol made up of a plurality of parallel bars imprinted thereon, each of said bars having a predetermined nominal width with predetermined positive and negative tolerances permissible for the width thereof, which bars are to have a predetermined spacing, a device for inspecting said code symbol comprising
a sheet member,
and means on said sheet member defining the borders of discrete viewable areas,
said areas being spaced apart at distances corresponding to the spacing required for at least some of said bars of said code symbol, each of said areas having a first relatively wide portion, and a first relatively narrow portion,
each of said first relatively wide portions having opposed edges spaced apart the dimension of said nominal width plus said positive tolerance of the one of said bars which is at the corresponding location in said code symbol, and each of said relatively narrow portions having opposed edges spaced apart the dimension of said nominal width minus said negative tolerance of the one of said bars which is at the corresponding location in said code symbol,
said sheet member being adjacent said object and said code symbol such that at least some of said bars are visible at said viewable areas for determining if said bars are within acceptable tolerances of width and spacing.

19. A device as recited in claim 18 in which there is a clear area on said object at either end of said code symbol, and including in addition an indicia on said sheet spaced outwardly a predetermined distance on one side of said viewable areas, and an indicia on said sheet spaced outwardly a predetermined distance on the opposite side of said viewable areas, said indicia being spaced apart a greater distance than the width of said code symbol for measuring said clear area at either end of said code symbol.

20. A device as recited in claim 18 in which each of said discrete viewable areas includes a second relatively narrow portion aligned with and wider than said first relatively narrow portion by a predetermined amount, and a second relatively wide portion aligned with and narrower than said first relatively wide portion by a predetermined amount.

21. A device as recited in claim 20 in which each of said second relatively wide portions has a width corresponding to said nominal bar width plus a predetermined percentage of said positive tolerance of the one of said bars to be inspected thereat, and in which each of said second relatively narrow portions has a width corresponding to said nominal bar width minus a predetermined percentage of said negative tolerance of the one of said bars to be inspected thereat.

22. A device as recited in claim 21 in which said predetermined percentage is the same for said second relatively wide portion and for said second relatively narrow portion.

23. A device as recited in claim 22 in which said predetermined percentage is eighty percent.

24. A device as recited in claim 20 in which said viewable areas have parallel straight opposed edges in said first relatively wide and narrow portions and in said second relatively wide and narrow portions.

25. A device as recited in claim 24 in which said viewable areas are windows in said sheet member, said first and second relatively narrow portions being adjacent each other, and said first and second relatively wide portions being relatively remote from each other in said windows.

26. A device as recited in claim 25 in which said sheet member has a straight edge, each of said viewable areas being a window having said first relatively wide portion adjacent said straight edge of said sheet member, said first relatively narrow portion is inwardly of said first relatively wide portion, said second relatively narrow portion is inwardly of said first relatively narrow portion, and said second relatively wide portion is inwardly of said second relatively narrow portion.

27. The method of inspecting a code symbol made up of a plurality of spaced parallel bars which are to have a predetermined spacing therebetween, and in which each of said bars is to have a width dimension within predetermined maximum and minimum limits, comprising the steps of
providing a sheet member,
providing on said sheet member discrete viewable areas spaced apart at a spacing corresponding to that required for at least some of said bars of said code symbol,
with each of said areas being given a relatively wide portion corresponding to the maximum dimension permissible for a bar in said code symbol at a location corresponding thereto, and a relatively narrow portion having a width corresponding to the minimum width permissible for a bar in said code symbol at a location corresponding thereto,
positioning said sheet relative to said code symbol such that at least some of said bars of said code symbol are adjacent corresponding viewable areas of said sheet,
while relatively shifting the positions of said sheet and said code symbol to determine if said adjacent bars of said code symbol can at any one relative position all fall entirely within said viewable areas,
and determining if said bars have width dimensions at least as great as the relatively narrow portions of said viewable areas corresponding thereto, said determination including the step of substantially centering at least some of said bars relative to the corresponding relatively narrow portions for comparing the widths of said some bars with the dimensions of said relatively narrow portions.

28. The method as recited in claim 27 in which for providing said viewable areas said sheet member is made opaque for at least a portion thereof, and transparent areas are provided in said sheet member, said transparent areas being provided with edges defining said relatively wide portions and said relatively narrow portions.

29. The method as recited in claim 28 in which said transparent areas are provided in an edge of said sheet member and are made substantially T-shaped.

30. The method as recited in claim 27 in which said code symbol includes numerals in a predetermined location relative to said bars, and including the steps of providing said sheet with an additional viewable area thereon such that when said sheet is so positioned relative to said code symbol said numerals of said code symbol are viewable at said additional viewable area, providing on said sheet adjacent said additional viewable area numerals corresponding to said numerals of said code symbol, and comparing said numerals on said sheet with said numerals of said code symbol.

31. The method as recited in claim 28 in which fewer of said viewable areas are provided than the total number of said bars for inspecting selected ones of said bars.

32. The method as recited in claim 27 in which each of said areas is given a second relatively wide portion aligned with and narrower than said first-mentioned relatively wide portion by a predetermined amount, and a second relatively narrow portion wider than said first-mentioned relatively narrow portion by a predetermined amount, and including the step of determining if said bars have width dimensions approaching unacceptable limits by positioning at least some of said bars in said second relatively wide and said second relatively narrow portions for comparing the widths of said some bars with the dimensions of said second relatively wide and second relatively narrow portions.

* * * * *